United States Patent
Krahn et al.

(10) Patent No.: US 8,850,227 B1
(45) Date of Patent: Sep. 30, 2014

(54) CRYPTOGRAPHIC OPERATIONS USING A KEY HIERARCHY

(75) Inventors: Darren Krahn, Cupertino, CA (US); Sumit Gwalani, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 33 days.

(21) Appl. No.: 13/604,587

(22) Filed: Sep. 5, 2012

(51) Int. Cl.
- H04L 9/00 (2006.01)
- G06F 21/00 (2013.01)
- H04L 9/32 (2006.01)
- G06F 21/57 (2013.01)

(52) U.S. Cl.
CPC .............. *G06F 21/57* (2013.01); *H04L 9/3234* (2013.01)
USPC .......................................... 713/189; 380/277

(58) Field of Classification Search
None
See application file for complete search history.

(56) References Cited

U.S. PATENT DOCUMENTS

2002/0059286 A1* 5/2002 Challener ..................... 707/100

OTHER PUBLICATIONS

Yoder, "TrouSerS PKCS#11 interface docs," retrieved from <http://trousers.sourceforge.net/pkcs11.html>, visited Jun. 6, 2012.

* cited by examiner

*Primary Examiner* — Gilberto Barron, Jr.
*Assistant Examiner* — Devin Almeida
(74) *Attorney, Agent, or Firm* — McDermott Will & Emery LLP (57) ABSTRACT

Aspects of the subject technology relate to systems, methods, and machine-readable media for performing a cryptographic operation. A system can be configured to submit a request, to a security device, for a decrypted user encryption key, wherein the security device is configured to decrypt the user encryption key by unbinding the user encryption key using a user authorization key. The system can receive, in response to the submitted request, the decrypted user encryption key and decrypt authorization data for a cryptographic key using the decrypted user encryption key. The system can submit a request for the security device to load the cryptographic key, wherein authorization data is used to authorize the request, and submit a request for the security device to perform a cryptographic operation using the loaded cryptographic key.

19 Claims, 5 Drawing Sheets

CRYPTOGRAPHIC OPERATIONS USING A KEY HIERARCHY

BACKGROUND

The present disclosure generally relates to computing platforms and, in particular, to performing cryptographic operations in computing systems.

Many cryptographic operations use cryptographic keys that protect information through various means such as encryption and decryption, digital signature schemes, and message authentication techniques. Some computing platforms may use a trusted platform module (TPM) to securely generate cryptographic keys and control the use of the generated cryptographic keys in cryptographic operations. A TPM device is a hardware component (e.g., a chip or other security device) located on the computing platform that is accessible to the other components of the computing platform. To assure the integrity of cryptographic processes or computing platforms, trusted platform modules may use a key hierarchy that includes keys stored by the TPM device and keys stored outside of the TPM device.

SUMMARY

Aspects of the subject technology relate to a system for performing a cryptographic operation. The system may include one or more processors, a trusted platform module (TPM) device, and a machine-readable medium comprising instructions stored therein, which when executed by the one or more processors, cause the processors to perform operations. The operations may include submitting a request, to the TPM device, for a decrypted user encryption key, wherein the TPM device is configured to decrypt the user encryption key by unbinding the user encryption key using a user authorization key, receiving, in response to the submitted request, the decrypted user encryption key, and decrypting authorization data for a cryptographic key using the decrypted user encryption key. The operations may also include submitting a request for the TPM device to load the cryptographic key, wherein authorization data is used to authorize the request for the TPM device to load the cryptographic key, and submitting a request for the TPM device to perform a cryptographic operation using the loaded cryptographic key.

Aspects of the subject technology also relate to a method for performing a cryptographic operation. The method may include submitting a request, to a security device, for a decrypted user encryption key, wherein the security device is configured to decrypt the user encryption key by unbinding the user encryption key using a user authorization key and receiving, in response to the submitted request, the decrypted user encryption key. The method may further include decrypting authorization data for a cryptographic key using the decrypted user encryption key, submitting a request for the security device to load the cryptographic key, wherein authorization data is used to authorize the request, and submitting a request for the security device to perform a cryptographic operation using the loaded cryptographic key.

Aspects of the subject technology also relate to a machine-readable medium including instructions stored therein, which when executed by a machine, cause the machine to perform operations for performing a cryptographic operation. The operations may include requesting a decrypted user encryption key from a trusted platform module (TPM) device, wherein the TPM device is configured to decrypt the user encryption key by decrypting the user encryption key using a user authorization key and receiving, in response to the requesting, the decrypted user encryption key. The operations may further include decrypting authorization data for a cryptographic key using the decrypted user encryption key, submitting a request for the TPM device to load the cryptographic key, wherein authorization data is used to authorize the request, and submitting a request for the TPM device to perform a cryptographic operation using the loaded cryptographic key.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

A trusted platform module (TPM) device (e.g., a TPM chip or other security device) may be used by some computing systems to assure the integrity of cryptographic processes by keeping sensitive information out of system memory and the control of other software. However, TPM devices generally have limited computing resources relative to the computing systems on which they may be implemented (e.g., limited processing power and a limited number of slots for keys).

Accordingly, in many cases, user processes or applications that interact with a TPM device experience an increase in latency.

Various aspects of the subject technology relate to systems and methods for using a key hierarchy design that allows authorization data associated with a key to be decrypted outside of a TPM device. By allowing the authorization data to be decrypted outside of the TPM device, a system may be able to increase the performance of processes or applications that interact with the TPM device. Furthermore, although some aspects are discussed with respect to TPM devices, other aspects may also relate to other security devices as well as software configured to interact and control the security devices.

Figure 1:
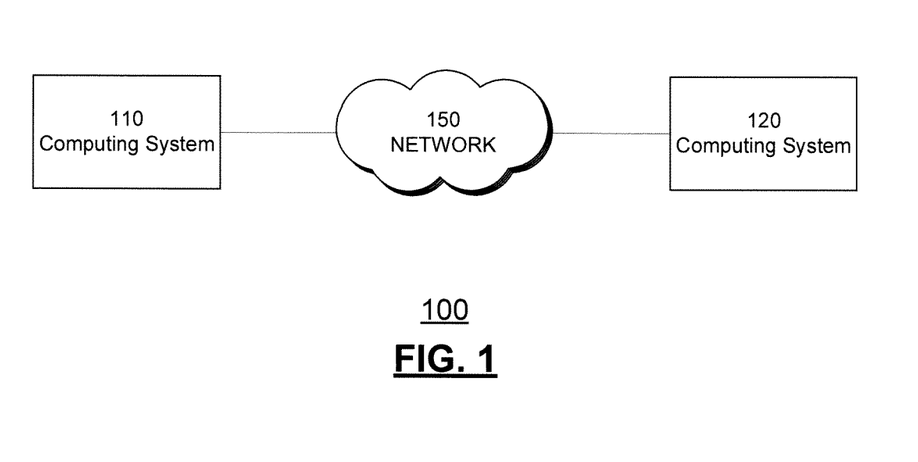
FIG. 1 illustrates an example network environment in which a computing system may exist, in accordance with aspects of the subject technology.

FIG. 1 illustrates an example network environment 100 in which a computing system may exist, in accordance with aspects of the subject technology. The network environment 100 includes computing systems 110 and 120 in communication with one another via a network 150 (e.g., the Internet).

The computing systems 110 and 120 may be servers, personal computers, laptops, mobile devices (e.g., smart phones, tablets, global positioning devices, etc.) or any other type of computing device. The computing systems 110 and 120 may communicate with one another in order to perform various functions or tasks. Some of these functions or tasks may require heightened security (e.g., digital rights management, password protection, or any other encryption-enabled applications). Accordingly, one (or both) of the computing systems 110 and 120 may have a TPM device configured generate and manage encryption keys Although FIG. 1 illustrates a client-server network environment 100, other aspects of the subject technology may include other configurations including, for example, peer-to-peer environments or single system environments. For example, computing systems may use a TPM device to assure the integrity of the computing system or protect passwords.

Figure 2:
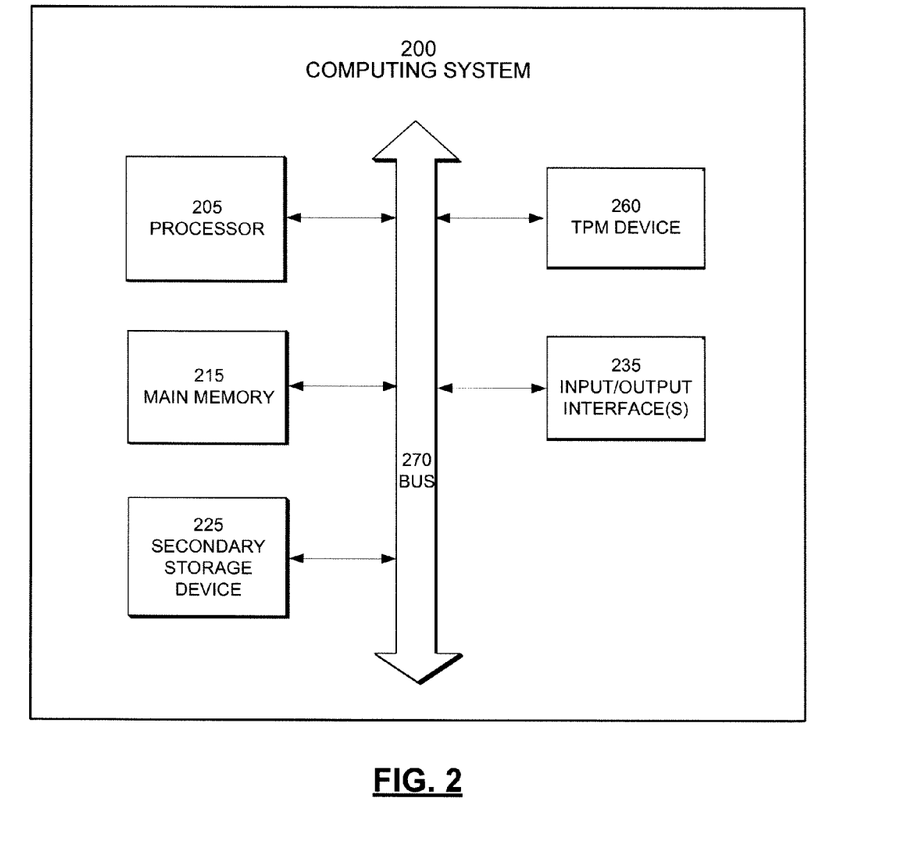
FIG. 2 is a block diagram illustrating a computing system, in accordance with aspects of the subject technology.

For example, FIG. 2 is a block diagram illustrating a computing system 200, in accordance with aspects of the subject technology. While the computing system 200 is shown in one configuration in FIG. 2, it is to be understood that the computing system 200 may include additional, alternative, and/or fewer components.

In the example shown in FIG. 2, the computing system 200 may include a processor 205, main memory 215 (e.g., random access memory), a secondary storage device 225 (e.g., a hard disk or other memory drive), one or more input/output interfaces 235, a network interface device 245, and a trusted platform module (TPM) device 260 which may communicate with one another via a bus 270. The bus 270 collectively represents all system, peripheral, and chipset buses that communicatively connect the numerous components of the computing system 200.

The processor 205 may be configured to control the various elements of the computing system 200 and perform various tasks by executing machine-readable instructions that are stored in main memory 215, the secondary storage device 225, or any other machine-readable medium (e.g., an external device via an input/output interface 235). The machine-readable instructions may be a part of an operating system, an application, TPM client software that uses the TPM device, or a set of software components (e.g., or a software stack) configured to manage and interface with the TPM device. The processor 205 may be implemented as a single processor, a multi-core processor, or multiple processors depending on the implementation.

The TPM device 260 may be a dedicated chip or microprocessor configured to carry out cryptographic operations. Although FIG. 2 shows a TPM device 260 as being a part of the system 200, other aspects may use other security chips or microprocessors instead of, or in addition to, the TPM device 260. As discussed above, the TPM device 260 may be used in conjunction with a set of software (e.g., a software stack) associated with the TPM device 260, which may conform to one or more standards or application programming interfaces (APIs).

Figure 3:
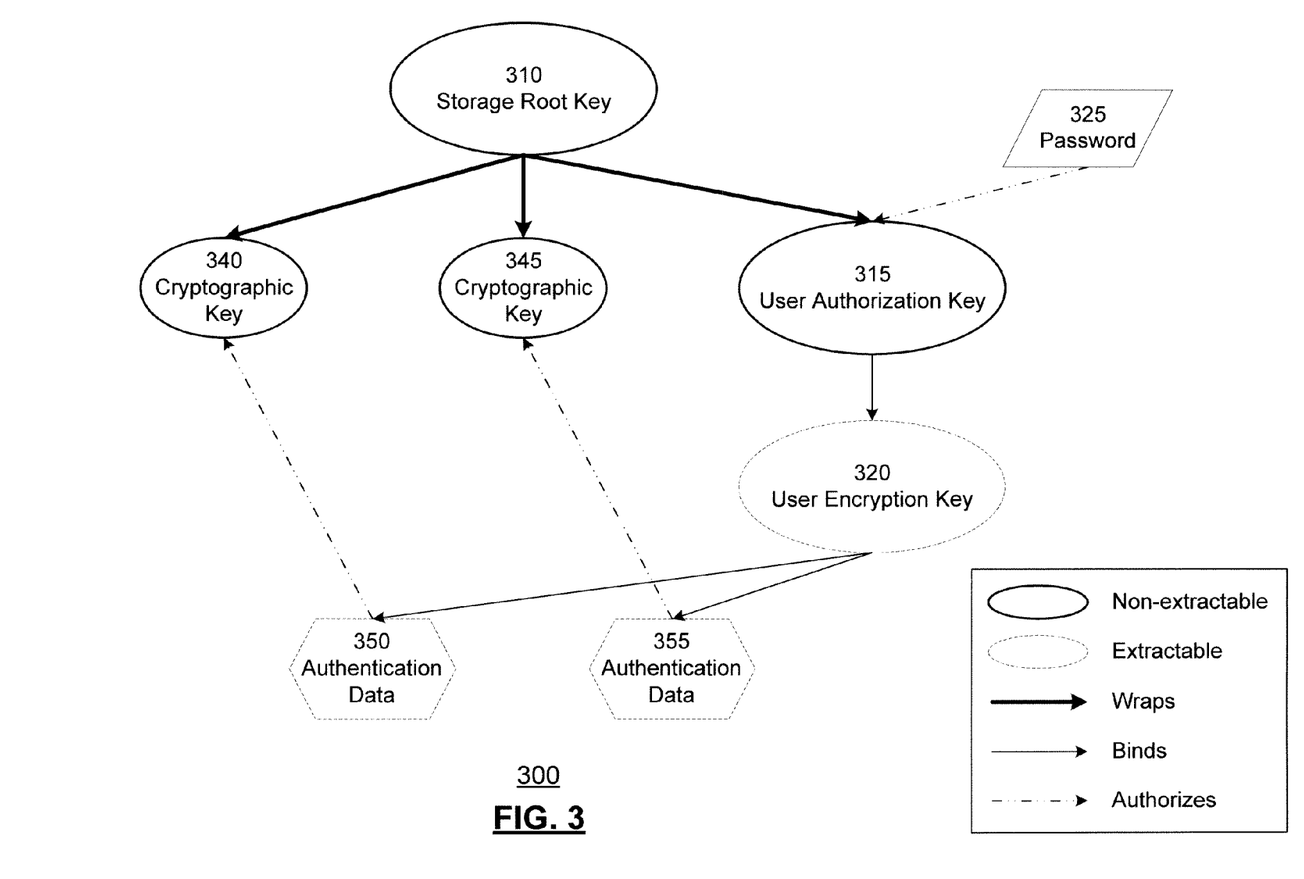
FIG. 3 is a block diagram illustrating an example key hierarchy, in accordance with aspects of the subject technology.

The set of software associated with the TPM device 260 may implement a key hierarchy such as the key hierarchy illustrated in FIG. 3. FIG. 3 is a block diagram illustrating an example key hierarchy 300, in accordance with aspects of the subject technology. The key hierarchy may include a storage root key 310, a user authorization key 315, a user encryption key 320, and one or more cryptographic keys 340 and 345. The key hierarchy 300 is intended only as an illustrative example as other aspects may relate to other key hierarchies that include additional elements, alternative elements, and/or fewer elements.

The storage root key 310 is a key that is embedded in the TPM device and configured to protect other keys so that these keys cannot be used without the TPM device. For example, the storage root key 310 may be configured to be used by the TPM device to encrypt keys and decrypt cryptographic keys. Encrypting keys may include "wrapping" keys such that they do not exist outside of the TPM device unencrypted or "binding" keys such that, upon decryption, the decrypted data is provided to a TPM client and, in doing so, the data may exist outside the TPM device in a decrypted form.

The cryptographic keys 340 and 345 may be used by a computing platform (e.g., a computing system) to perform one or more cryptographic operations. For example, they may be used to encrypt data (including other keys), decrypt data, or apply a digitally signature to a message or document. In FIG. 3, the cryptographic keys 340 and 345 may be "child" keys of the storage root key 310. Accordingly, the cryptographic keys 340 and 345 may be wrapped by the TPM device using the storage root key 310 such that they can only be decrypted by the TPM device using the same storage root key 310.

According to some aspects, the cryptographic keys 340 and 345 in the key hierarchy 300 may be symmetric keys or asymmetric keys (e.g., a private key/public key pair). Other aspects, however, the key hierarchy 300 may be implemented without public/private key schemes, public key hierarchies, or a private root key. Furthermore, although only two cryptographic keys 340 and 345 are shown in FIG. 3, fewer or additional cryptographic keys may also be used in the key hierarchy 300.

The user authorization key 315 may also be a "child" key of the storage root key 310 and may be wrapped using the storage root key 310. The user authorization key 315 may be a "parent" key of the user encryption key 320 and may be configured to be used by the TPM device to bind and/or unbind the user encryption key 320. According to some aspects, the TPM device may bind or unbind the user encryption key 320 only if the user authorization key 315 is loaded in the TPM device and the TPM device has been provided the appropriate authorization data (e.g., password 325, a personal identification number, or some other passphrase).

The user encryption key 320, when unencrypted, may be configured to encrypt and decrypt authorization data 350 and 355. For example, a processor along with software may use the user encryption key 320 to encrypt or decrypt authorization data 350 and 355 outside of the TPM device. Accordingly, since the TPM device typically has fewer computing resources then the computing platform that the TPM device is located on, these encryption and decryption operations may occur more quickly.

As discussed above, the authentication data 350 and 355 may be encrypted or decrypted using the user encryption key 320. The decrypted authentication data 350 and 355 may be used to authorize the decryption of the cryptographic keys 340 and 345 respectively. For example, in order to use the cryptographic key 340 for a cryptographic operation, the TPM device must be presented with the correct authorization data 350 before the cryptographic key 340 can be decrypted and loaded. Further details related to performing a cryptographic operation using the key hierarchy 300 are discussed with respect to FIG. 4.

Figure 4:
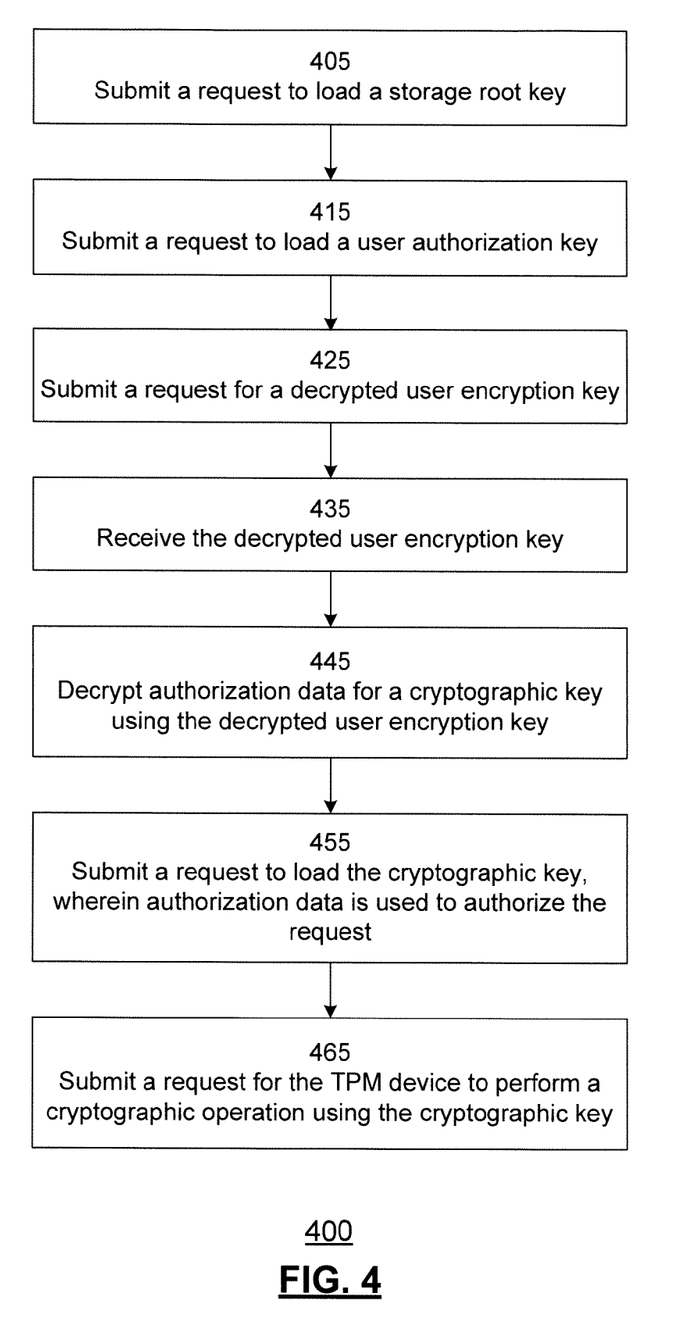
FIG. 4 is a flow chart illustrating an example process for performing a cryptographic operation in a trusted platform module (TPM) device, in accordance with aspects of the subject technology.

FIG. 4 is a flow chart illustrating an example process 400 for performing a cryptographic operation in a trusted platform module (TPM) device, in accordance with aspects of the subject technology. Although the operations in FIG. 4 are discussed with respect to the computing system 200 in FIG. 2, the operations are not limited to the components of the computing system 200. Furthermore, although the operations are shown in one particular order, other orderings of operations are also possible.

At step 405, a TPM client on a computing system (e.g., a processor in the computing system executing software that uses the TPM device) may submit a request, to a TPM device in the computing system, to load a storage root key. The request may include a reference to the storage root key or an identifier for the storage root key that indicates which key hierarchy or portion of the key hierarchy will be needed to perform the cryptographic operation. In response to receiving the request, the TPM device may load the storage root key.

At step 415, the TPM client may submit a request to the TPM device to load a user authorization key that, in the key hierarchy, is a child of the storage root key. According to some aspects, the request may include a reference of identifier for the user authorization key. In other aspects, the request may include the user authorization key itself, in an encrypted form. The request may also include authorization data for the user authorization key. The authorization data may be in the form of, for example, a user supplied password or personal identification number (PIN). In other aspects, however, the authorization data may come in other forms.

In response to receiving the request to load the user authorization key, the TPM device may load the user authorization key. The TPM client may then submit to the TPM device a request for a decrypted user encryption key at step 425. The request may include the encrypted user encryption key. In response to receiving the request, the TPM device may decrypt the user encryption key using the user authorization key and provide the decrypted user encryption key to the TPM client.

At step 435, the TPM client may receive the decrypted user encryption key and decrypt authorization data for a cryptographic key using the decrypted user encryption key at step 445. Once the authorization data is decrypted, the TPM client may submit a request to load the cryptographic key, which is a child of the storage root key, at step 455. The TPM device may use any of a number of authorization protocols to determine whether the TPM client is in possession of the correct authorization data. The authorization protocols may be executed within the TPM device, outside of the TPM device, or a combination of inside and outside the TPM device. In response to receiving the request and verifying that the TPM client has the correct authorization data, the TPM device may load the cryptographic key using the storage root key.

The TPM client may submit, to the TPM device, a request to perform a cryptographic operation using the loaded cryptographic key at step 465. The cryptographic operations may include, but are not limited to, digitally signing a document or other content, encrypting data, or decrypting data. In response to the request, the TPM device may perform the cryptographic operation using the cryptographic key.

According to some aspects, if the TPM client wishes to perform additional cryptographic operations using other cryptographic keys that are also children of the storage root key, the TPM client may decrypt the authorization data for the other cryptographic keys outside of the TPM device using the decrypted user encryption key as well. The TPM client may then request that the TPM device load the other cryptographic keys using the decrypted authorization data and perform the additional cryptographic operations.

By receiving the decrypted user encryption key from the TPM device, the TPM client is able to decrypt authorization data for one or more cryptographic keys that descend from the storage root key outside of the TPM device more quickly than if the authorization data was decrypted by the TPM device.

Figure 5:
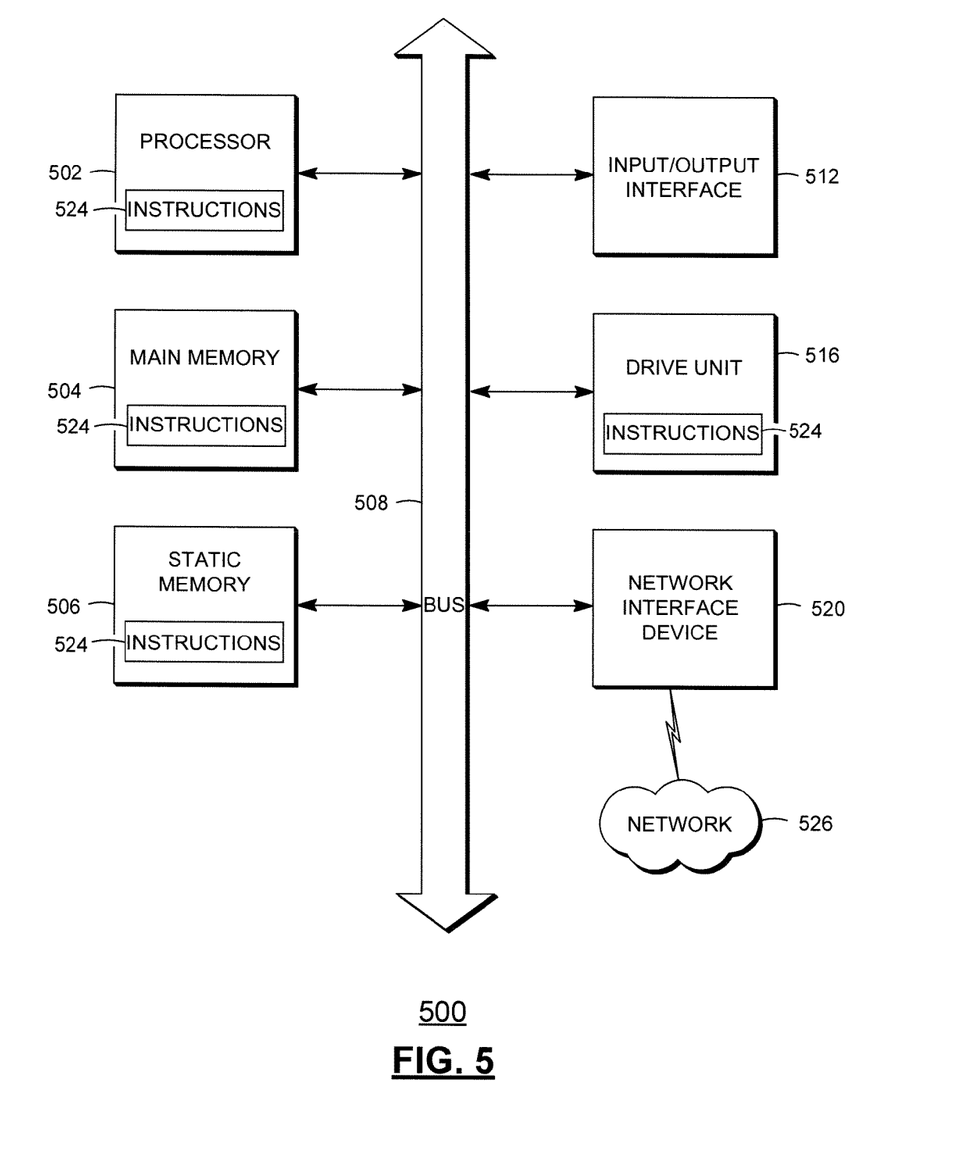
FIG. 5 is a block diagram illustrating a computing system with which any of the aspects described herein may be implemented.

FIG. 5 is a block diagram illustrating a computing system with which any of the aspects described herein may be implemented. In certain aspects, the computing system 500 may be implemented using hardware or a combination of software and hardware, either in a dedicated server, or integrated into another entity, or distributed across multiple entities.

The example computing system 500 includes a processor 502, a main memory 504, a static memory 506, a disk drive unit 516, and a network interface device 520 which communicate with each other via a bus 508. The computing system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computing system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for performing a cryptographic operation, the method comprising:
    submitting a request, to a security device, for a decrypted user encryption key, wherein the security device is configured to decrypt the user encryption key by unbinding the user encryption key using a user authorization key;
    receiving, outside the security device and in response to the submitted request, the decrypted user encryption key;
    decrypting, outside the security device, authorization data for a cryptographic key stored inside the security device using the decrypted user encryption key;
    submitting a request for the security device to load the cryptographic key, wherein the decrypted authorization data is used to authorize the request;
    submitting a request for the security device to perform a cryptographic operation using the loaded cryptographic key,
    wherein the security device is a trusted platform module (TPM) device; and
    prior to submitting the request for the decrypted user encryption key:
        submitting a request for the security device to load a storage root key, wherein the storage root key is a parent key of the user authorization key in a key hierarchy and the cryptographic key; and
        submitting a request for the security device to load the user authorization key that is configured to be decrypted by the storage root key, wherein the request to load the user authorization key includes authorization data for the user authorization key.

2. The method of claim 1, wherein the cryptographic operation is an operation to apply a digital signature to content.

3. The method of claim 1, wherein the decrypting of the authorization data for the cryptographic key occurs outside of the security device, using a processor on a computing system.

4. The method of claim 1, wherein the cryptographic key and the user authorization key are configured to be wrapped by the storage root key.

5. The method of claim 1, wherein the request for the decrypted user encryption key includes the user encryption key in encrypted form.

6. The method of claim 1, wherein the request for the security device to load the cryptographic key includes the cryptographic key in encrypted form.

7. The method of claim 1, further comprising:
    decrypting additional authorization data for an additional cryptographic key using the decrypted user encryption key;
    submitting a request for the security device to load the additional cryptographic key, wherein the request to load the additional cryptographic key includes the additional authorization data; and submitting a request for the security device to perform an additional cryptographic operation using the loaded additional cryptographic key.

8. A system for performing a cryptographic operation, the system comprising:
   one or more processors;
   a trusted platform module (TPM) device; and
   a machine-readable medium comprising instructions stored therein, which when executed by the one or more processors, cause the processors to perform operations comprising:
      submitting a request, to the TPM device, for a decrypted user encryption key, wherein the TPM device is configured to decrypt the user encryption key by unbinding the user encryption key using a user authorization key;
      receiving, outside the TPM device and in response to the submitted request, the decrypted user encryption key;
      decrypting, outside the TPM device, authorization data for a cryptographic key stored inside the TPM device using the decrypted user encryption key;
      submitting a request for the TPM device to load the cryptographic key, wherein the decrypted authorization data is used to authorize the request for the TPM device to load the cryptographic key;
      submitting a request for the TPM device to perform a cryptographic operation using the loaded cryptographic key; and
      prior to submitting the request for the decrypted user encryption key:
         submitting a request for the TPM device to load a storage root key; and
         submitting a request for the TPM device to load the user authorization key that is configured to be decrypted by the storage root key, wherein the request to load the user authorization key includes authorization data for the user authorization key.

9. The system of claim 8, wherein the cryptographic operation is an operation to apply a digital signature to content.

10. The system of claim 8, wherein the decrypting of the authorization data for the cryptographic key occurs outside of the TPM device, using a processor on a computing system.

11. The system of claim 8, wherein the cryptographic key and the user authorization key are configured to be wrapped by the storage root key.

12. The system of claim 8, wherein the operations further comprise:
   decrypting additional authorization data for an additional cryptographic key using the decrypted user encryption key;
   submitting a request for the TPM device to load the additional cryptographic key, wherein the request to load the additional cryptographic key includes the additional authorization data; and
   submitting a request for the TPM device to perform an additional cryptographic operation using the loaded additional cryptographic key.

13. A non-transitory machine-readable medium comprising instructions stored therein, which when executed by a machine, cause the machine to perform operations comprising:
   requesting a decrypted user encryption key from a trusted platform module (TPM) device, wherein the TPM device is configured to decrypt the user encryption key by decrypting the user encryption key using a user authorization key;
   receiving, outside the TPM device and in response to the requesting, the decrypted user encryption key;
   decrypting, outside the TPM device, authorization data for a cryptographic key stored inside the TPM device using the decrypted user encryption key;
   submitting a request for the TPM device to load the cryptographic key, wherein the decrypted authorization data is used to authorize the request;
   submitting a request for the TPM device to perform a cryptographic operation using the loaded cryptographic key; and
   prior to submitting the request for the decrypted user encryption key:
      submitting a request for the TPM device to load a storage root key; and
      submitting a request for the TPM device to load the user authorization key that is configured to be decrypted by the storage root key.

14. The non-transitory machine-readable medium of claim 12, wherein the cryptographic operation is an operation to decrypt digital content.

15. The non-transitory machine-readable medium of claim 13, wherein the cryptographic key and the user authorization key are configured to be wrapped by the storage root key.

16. The non-transitory machine-readable medium of claim 13, wherein the operations further comprise:
   decrypting additional authorization data for an additional cryptographic key using the decrypted user encryption key;
   submitting a request for the TPM device to load the additional cryptographic key, wherein the request to load the additional cryptographic key includes the additional authorization data; and
   submitting a request for the TPM device to perform an additional cryptographic operation using the loaded additional cryptographic key.

17. A method for performing a cryptographic operation, the method comprising:
   submitting a request, to a security device, for a decrypted user encryption key, wherein the security device is configured to decrypt the user encryption key by unbinding the user encryption key using a user authorization key;
   receiving, outside the security device and in response to the submitted request, the decrypted user encryption key;
   decrypting, outside the security device, authorization data for a cryptographic key stored inside the security device using the decrypted user encryption key;
   submitting a request for the security device to load the cryptographic key, wherein the decrypted authorization data is used to authorize the request;
   submitting a request for the security device to perform a cryptographic operation using the loaded cryptographic key;
   decrypting additional authorization data for an additional cryptographic key using the decrypted user encryption key;
   submitting a request for the security device to load the additional cryptographic key, wherein the request to load the additional cryptographic key includes the additional authorization data; and
   submitting a request for the security device to perform an additional cryptographic operation using the loaded additional cryptographic key.

18. A system for performing a cryptographic operation, the system comprising:
   one or more processors;
   a trusted platform module (TPM) device; and a machine-readable medium comprising instructions stored therein, which when executed by the one or more processors, cause the processors to perform operations comprising:
- submitting a request, to the TPM device, for a decrypted user encryption key, wherein the TPM device is configured to decrypt the user encryption key by unbinding the user encryption key using a user authorization key;
- receiving, outside the TPM device and in response to the submitted request, the decrypted user encryption key;
- decrypting, outside the TPM device, authorization data for a cryptographic key stored inside the TPM device using the decrypted user encryption key;
- submitting a request for the TPM device to load the cryptographic key, wherein the decrypted authorization data is used to authorize the request for the TPM device to load the cryptographic key;
- submitting a request for the TPM device to perform a cryptographic operation using the loaded cryptographic key;
- decrypting additional authorization data for an additional cryptographic key using the decrypted user encryption key;
- submitting a request for the TPM device to load the additional cryptographic key, wherein the request to load the additional cryptographic key includes the additional authorization data; and
- submitting a request for the TPM device to perform an additional cryptographic operation using the loaded additional cryptographic key.

19. A non-transitory machine-readable medium comprising instructions stored therein, which when executed by a machine, cause the machine to perform operations comprising:
- requesting a decrypted user encryption key from a trusted platform module (TPM) device, wherein the TPM device is configured to decrypt the user encryption key by decrypting the user encryption key using a user authorization key;
- receiving, outside the TPM device and in response to the requesting, the decrypted user encryption key;
- decrypting, outside the TPM device, authorization data for a cryptographic key stored inside the TPM device using the decrypted user encryption key;
- submitting a request for the TPM device to load the cryptographic key, wherein the decrypted authorization data is used to authorize the request;
- submitting a request for the TPM device to perform a cryptographic operation using the loaded cryptographic key;
- decrypting additional authorization data for an additional cryptographic key using the decrypted user encryption key;
- submitting a request for the TPM device to load the additional cryptographic key, wherein the request to load the additional cryptographic key includes the additional authorization data; and
- submitting a request for the TPM device to perform an additional cryptographic operation using the loaded additional cryptographic key.

* * * * *